(12) United States Patent
Hipschman et al.

(10) Patent No.: US 9,779,446 B1
(45) Date of Patent: Oct. 3, 2017

(54) COLLECTING CUSTOMER PREFERENCES

(71) Applicant: Square, Inc., San Francisco, CA (US)

(72) Inventors: Daniel Hipschman, San Francisco, CA (US); James F. Butts, III, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/587,913

(22) Filed: Dec. 31, 2014

(51) Int. Cl.
| | |
|---|---|
| *G06Q 30/00* | (2012.01) |
| *G06Q 50/00* | (2012.01) |
| *G06Q 20/00* | (2012.01) |
| *G06Q 30/06* | (2012.01) |
| *G06Q 50/12* | (2012.01) |
| *G06Q 20/40* | (2012.01) |
| G06F 17/00 | (2006.01) |
| G06Q 30/02 | (2012.01) |
| G06F 9/00 | (2006.01) |

(52) U.S. Cl.
CPC ....... *G06Q 30/0637* (2013.01); *G06Q 20/405* (2013.01); *G06Q 30/0621* (2013.01); *G06Q 30/0639* (2013.01); *G06Q 50/12* (2013.01); *G06F 9/00* (2013.01); *G06F 17/00* (2013.01); *G06Q 30/00* (2013.01); *G06Q 30/02* (2013.01)

(58) Field of Classification Search
CPC ........ G06Q 30/00–30/02; G06Q 20/20; G06Q 20/00; G06Q 20/10; G06Q 20/208; G06F 17/00; G06F 9/00; G06G 5/00
USPC .................. 705/15, 16, 26.2, 14.67, 23, 70; 700/233–237; 709/217
See application file for complete search history.

(56) References Cited

U.S. PATENT DOCUMENTS

| | | | | |
|---|---|---|---|---|
| 6,646,659 | B1 * | 11/2003 | Brown | G06Q 30/02 705/15 |
| 7,324,958 | B2 * | 1/2008 | Miyazaki | G06Q 20/20 705/15 |
| 7,407,089 | B2 | 8/2008 | Patrick | |
| 7,680,690 | B1 * | 3/2010 | Catalano | G06Q 30/02 186/38 |
| 8,417,377 | B2 * | 4/2013 | Rothschild | B67D 1/0041 700/233 |
| 8,892,249 | B2 * | 11/2014 | Holman | G06F 17/00 700/233 |
| 8,918,355 | B2 * | 12/2014 | Perrier | G06N 5/02 706/47 |
| 9,334,150 | B1 | 5/2016 | Ost et al. | |
| 2002/0059147 | A1 * | 5/2002 | Ogasawara | G06Q 20/108 705/70 |

(Continued)

OTHER PUBLICATIONS

U.S. Appl. No. 14/587,984, of Hipschman, D., et al., filed Dec. 31, 2014.

(Continued)

*Primary Examiner* — Olusegun Goyea
(74) *Attorney, Agent, or Firm* — Polsinelli PC

(57) ABSTRACT

This disclosure describes, in part, techniques for collecting item preferences of users at a centralized location and propagating these item preferences to users and merchants in an intelligent manner. In some instances, the centralized location is a payment service that functions to both authorize payment instruments of users for costs of transactions conducted at the merchant, and collect and propagate the item preferences to the merchants and the users.

20 Claims, 13 Drawing Sheets

(56) References Cited

U.S. PATENT DOCUMENTS

| | | | |
|---|---|---|---|
| 2002/0065728 A1* | 5/2002 | Ogasawara | G06Q 20/208 705/23 |
| 2002/0174010 A1* | 11/2002 | Rice, III | G06F 17/30194 705/14.67 |
| 2007/0088624 A1 | 4/2007 | Vaughn et al. | |
| 2008/0104199 A1* | 5/2008 | Kalaboukis | G06Q 30/02 709/217 |
| 2008/0154781 A1 | 6/2008 | Kumar | |
| 2009/0063312 A1* | 3/2009 | Hurst | G06Q 20/105 705/30 |
| 2011/0125566 A1 | 5/2011 | McLaughlin et al. | |
| 2012/0127490 A1* | 5/2012 | Ogasawara | G06F 21/10 358/1.2 |
| 2013/0311315 A1* | 11/2013 | Zises | G06Q 30/0605 705/26.2 |
| 2014/0279123 A1 | 9/2014 | Harkey et al. | |
| 2015/0142604 A1 | 5/2015 | Kneen | |
| 2015/0254699 A1* | 9/2015 | Bondesen | G06Q 30/0215 705/14.17 |
| 2015/0304806 A1* | 10/2015 | Vincent | H04W 4/02 455/456.3 |

OTHER PUBLICATIONS

U.S. Appl. No. 14/588,044, of Hipschman, D., et al., filed Dec. 31, 2014.
Non-Final Office Action mailed Apr. 2, 2015 for U.S. Appl. No. 14/587,984, of Hipschman, D., et al., filed Dec. 31, 2014.
Advisory Action mailed Feb. 19, 2016, for U.S. Appl. No. 14/587,984, of Hipschman, D., et al., filed Dec. 31, 2014.
Non-Final Office Action mailed Apr. 4, 2016, for U.S. Appl. No. 14/587,984, of Hipschman, D., et al. filed Dec. 31, 2014.
Final Office Action mailed Sep. 25, 2015, for U.S. Appl. No. 14/587,984, of Hipschman, D., et al., filed Dec. 31, 2014.
Non-Final Office Action mailed Mar. 9, 2017, for U.S. Appl. No. 14/588,044, of Hipschman, D., et al., filed Dec. 31, 2014.
Notice of Allowance mailed Oct. 13, 2016, for U.S. Appl. No. 14/587,984, of Hipschman, D., et al., filed Dec. 31, 2014.

* cited by examiner

COLLECTING CUSTOMER PREFERENCES

BACKGROUND

Merchants continually strive to create the best possible experience for their customers. For instance, merchants often customize items to meet customer requests. In instances where a certain customer often frequents a particular merchant, the merchant may automatically prepare an item according to the customer's tastes. For instance, a customer that orders a same tall vanilla, extra hot latte from a same merchant each morning may receive that drink simply in response to entering the merchant's premises. However, if the customer were to frequent a different coffee shop, that merchant would be unaware of the customer's preferences.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
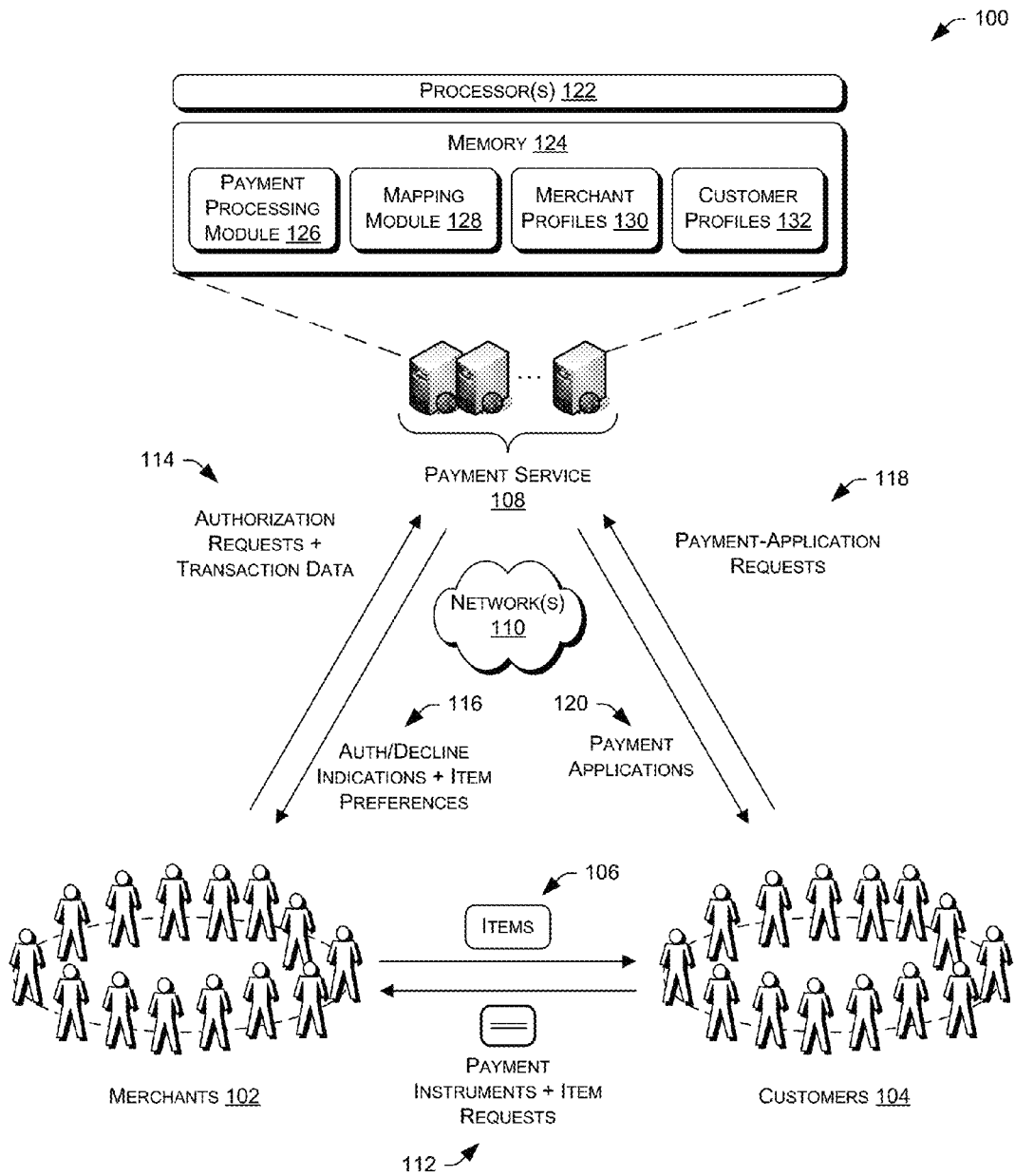
FIG. 1 illustrates an example environment that includes merchants that conduct transactions with customers, as well as a payment service to authorize payment instruments of the customers. In this environment, customers express item preferences to merchants, who share this information with the payment service. The payment service collects these preferences and intelligently propagates them to some or all of the merchants to enhance customer experiences at the merchants.

This disclosure describes, in part, techniques for collecting item preferences of users at a centralized location and propagating these item preferences to users and merchants in an intelligent manner. In some instances, the centralized location is a payment service that functions to both authorize payment instruments of users for costs of transactions conducted at the merchant, and collect and propagate the item preferences to the merchants and the users.

To illustrate, a customer (or "user") may engage in a transaction with a merchant for an item offered by a merchant. During the transaction, the customer may request to customize the item in some way. This customization may relate to a size of the item (e.g., tall, 16 oz., large, etc.), a color of the item (e.g., red, blue, etc.), an ingredient to include or not to include in the item (e.g., soy milk, no nuts, etc.), a preparation type of the item (e.g., rare temperature, extra hot drink, etc.), a flavor of the item (e.g., lemon-lime, cherry, etc.), or any other item customization. To pay for the cost of the transaction, the customer may provide cash or a payment instrument (or other consideration) to the merchant. The merchant may then send an indication of the transaction, including the requested customization, to a payment service. In instances where the customer uses a payment instrument to pay for the cost of the transaction, the payment service may also send a request to the payment service to authorize the payment instrument for the cost of the transaction.

Upon receiving the information regarding the transaction, the payment service may identify the user associated with the transaction. For example, in instances where the merchant sends a request to authorize a payment instrument of the user, the payment service may identify the customer from the payment instrument. In another example, the merchant may include an indication of the identity of the customer to the payment service.

In addition to identifying the customer, the payment service may identify the item preference associated with the transaction and may store this item preference in a profile of the customer at the payment service. In some instances, the customer has an existing profile at the payment service, while in instances where the payment service has never identified the customer before, the payment service may create a profile of the user and associate the item preference with the newly created profile. In some instances, the payment service may attempt to authorize the payment instrument for the cost of the transaction and may send an indication to the merchant regarding whether or not the payment instrument has been authorized or declined.

Because the payment service may work with a variety of merchants, the payment service may continue to collect item preferences of customers. In some instances, one such customer may later request that the payment service provide a payments application to a device of the customer. This payments application may allow the customer to pay for items at merchants that work with the payment service, and may further include information regarding the merchants (e.g., menus, hours, location, etc.). In response to receiving this request, the payment service may associate an instance of the application provided to the customer device with the device of the customer, with any payment instruments associated with the customer, and with the profile of the customer at the payment service. Therefore, the previously stored item preferences associated with the customer may be associated with the instance of the application executable on the customer device.

Regardless of whether a customer utilizes a payments application from the payment service, the payment service may intelligently propagate item preferences of customers to merchants. For example, continuing the example from above, envision that the customer that has previously expressed first item preference at a first merchant visits a location of a second merchant. The payment service may determine that the customer is located at the second merchant and may provide an indication of the item preference to the second merchant. In some instances, the payment services may determine which one or more item preferences to provide to the merchant based on the class of item(s) offered by the merchant and the class of items that each item preference is associated with.

For example, envision that a user visits a first coffee shop and orders an extra hot latte. The first merchant may send a request to authorize a payment instrument of the customer for the cost of the latte, along with an itemized receipt. In addition to attempting to authorize the payment instrument of the user, the payment service may identify the "extra hot" item preference, may associated this item preference with "coffee items", and may associate this preference with the profile of the customer.

Thereafter, the customer may enter an establishment of a second merchant that also offers coffee items. In response to identifying that the customer is located at the second merchant, the payment service may determine that the "extra hot" item preference of the customer is pertinent to the second merchant and, hence, may send an indication of the item preference to a device of the second merchant. Therefore, even if the customer has never visited the second merchant, the second merchant may learn of the customer's preference for "extra hot" drinks and may suggest that the customer order an extra hot drink according to his preference.

In some instances, the payment service may also provide information regarding the customer's item preferences to a device of the customer. For instance, the device of the customer may store a payments application that is executable to allow the customer order items from merchants, such as the first and second merchants. Upon the customer visiting the second merchant, or upon the customer requesting information regarding the second merchant, the payments application may indicate, to the customer, that the second merchant offers "extra hot" lattes.

The payment service may determine that the customer is present at the second merchant in a number of ways. For instance, when a customer provides a payment instrument to the second instrument for a cost of an item ordered by the customer, the device of the second merchant may send a request to authorize the payment instrument to the payment service. The payment service may then map this payment instrument to the customer. In another example, the device of the second merchant, the device of the customer, or a third device may determine that the device of the customer is proximate (i.e., within a threshold distance of) the device of the merchant. For instance, both the device of the second merchant and the device of the customer (e.g., executing the payments application) may share each device's GPS coordinates with the payment service, which may use this information to determine whether the customer is located at the merchant. In yet another example, the customer may utilize a device to "check in" at the second merchant via a social network. Of course, while a few examples have been listed, it is to be appreciated that the payment service may determine that the customer is located at the second merchant in any number of ways.

In response to determining that the customer is located at the second merchant, the payment service may determine whether any of the item preferences associated with the user are pertinent to the second merchant. If so, then the payment service may send one or more of these preferences to the second merchant. In some instances, the payment service may rank the item preferences according to pertinence to the second merchant and may send one or more of the most pertinent item preferences. In another example, the payment service may send all pertinent item preferences to the second merchant. In another example, the payment service may send only item preferences that are pertinent to an item currently being ordered by the customer. For instance, the payment service may only send an indication of the customer's preference for "extra hot" drinks if the customer actually orders a hot drink from the second merchant. Depending on how the payment service determines that the customer is located at the second merchant, the payment service may send the indication of the item preference to the second merchant upon the customer arriving at the premises of the second merchant, prior to the customer ordering an item, as part of the checkout process for an ordered item, or the like.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 that includes merchants 102 that conduct transaction with customers 104 (or "users 104") for items 106 offered by the merchants 102. FIG. 1 also illustrates a payment service 108, coupled to merchant devices and customer devices via a network 110, to authorize payment instruments of the customers 104.

As illustrated, individual ones of the customers 104 may engage in transactions with the merchants 102 to obtain items 106. The customers may provide, as shown at 112, cash or payment instruments to the merchants along with requests for items offered by the merchants. These requests may include requested customizations, such as a requested size, flavor, ingredients, preparation, or the like.

The merchants may utilize respective point-of-sale (POS) devices (see FIGS. 2, 16) for accepting payment from the customers 104. The POS devices may comprise any sort of mobile or non-mobile devices that include instances of a merchant application that executes on the respective devices. The merchant application may provide POS functionality to the POS device to enable the merchants 102 (e.g., owners, employees, etc.) to accept payments from the customers 104. In some types of businesses, the POS device may correspond to a store or other place of business of the merchant, and thus, may be a fixed location that typically does not change on a day-to-day basis. In other types of businesses, however, the location of the POS device may change from time to time, such as in the case that a merchant operates a food truck, is a street vendor, is a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between one of the customers 104 and one of the merchants 102. For example, when paying for a transaction, the customer can provide the amount that is due to the merchant using cash or other payment instrument (e.g., a debit card, a credit card, a stored-value or gift card, a check, through an electronic payment application on a device carried by the customer, or the like). The merchant can interact with the POS device to process the transactions, such as by inputting (e.g., manually, via a magnetic card reader or an RFID reader, etc.) identifiers associated with the payment instruments. For example, a payment instrument of the customer may include one or more magnetic strips for providing card and customer information when swiped in a card reader. In other examples, other types of payment cards may be used, such as smart cards having a built-in memory chip that is read by the device when the card is "dipped" into the reader, a radiofrequency identification tag, or so forth.

During the transaction, the POS device can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, a name of the customer, contact information of the customer, and so forth. The POS device can send the transaction information to the payment service 108 over a network 110, either substantially contemporaneously with the conducting of the transaction (in the case of online transactions) or later when the device is in the online mode (in the case offline transactions).

In an offline transaction, the POS device may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with one of the customers 104, the POS device may provide the stored information (or some subset of it) to the payment service 108 over the network 110. The network 110 may represent any one or more wired or wireless networks, such as a WiFi network, a cellular network, or the like. In an online transaction, the POS device may send this information to the payment service 108 over the network 110 substantially contemporaneously with the transaction with the customer.

After the merchants 102 receive the payment information from the customers 104, the merchants may send respective authorization requests, along with information regarding the respective transactions, to the payment service 108, as illustrated at 114. The payment service 108 may include one or more processors 122 and memory 124, which may store a payment processing module 126, a mapping module 128, one or more merchant profiles 130, and one or more customer profiles 132.

The payment processing module 126 may function to receive the information regarding a transaction from the POS device of a merchant and attempt to authorize the payment instrument used to conduct the transaction. The payment processing module 126 may then send an indication of whether the payment instrument has been approved or declined back to the POS device, potentially along with one or more item preferences of the customer, as illustrated at 116.

Generally, when a customer and a merchant enter into an electronic payment transaction, the transaction is processed by electronically transferring funds from a financial account associated with the customer to a financial account associated with the merchant. As such, the payment processing module 126 may communicate with one or more computing devices of a card network (or "card payment network"), e.g., MasterCard®, VISA®, over the network 110 to conduct financial transactions electronically. The payment processing module 126 can also communicate with one or more computing devices of one or more banks, processing/acquiring services, or the like over the network 110. For example, the payment processing module 126 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In addition to attempting to authorize a payment instrument of a user, the payment service 108 may identify, from the transaction data associated with a particular transaction, an item preference expressed at a time when the user ordered the corresponding item. For instance, the transaction data may indicate, continuing the example above, that the user ordered the latte as a "tall" and as "extra hot". The mapping module 128 may map the payment instrument of the user to an identity of the user (e.g., using a name on the instrument) and may store this information in a profile of the user maintained in the customer profiles 132. While FIG. 1 illustrates the merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process. Again, in these instances the mapping module 128 may map the transactions, and the item preferences expressed therein, to the corresponding customer profiles.

While the customer profiles 132 may store indications of user preferences, the merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

After the payment service 108 associates an item preference of a customer to a corresponding customer profile of the customer, the payment service 108 may utilize this information when the customer visits the same merchant or a different merchant. For instance, envision that the customer described above has ordered an extra hot latte from a first merchant, who has communicated this preference to the payment service 108. In response, the payment service 108 associates this item preference with the profile of the customer. Thereafter, envision that the customer visits a second, different merchant. In response to determining that the customer is located at the second merchant, the payment service 108 may determine whether to provide any previously stored item preferences of the user to the second merchant. To do so, the payment service 108 may determine, for each preference, a class of items to which the item preference is pertinent to and may determine whether the second merchant offers any of the classes of items associated with the item preferences of the customer. If so, then the payment service 108 may send the respective item preference to the second merchant (but may refrain from non-pertinent item preferences). In the instant example, for instance, the payment service 108 may send the item preference of "extra hot" to the second merchant in instances where the second merchant offers coffee items (or is labeled as a coffee shop or the like), but may refrain from doing so if the second merchant is, for example, a shoe store.

The payment service 108 may determine that the customer is located at the second merchant in a number of ways. For instance, if the customer engages in a transaction with the second merchant and provides a payment instrument to the second merchant for satisfying a cost of the transaction, then the payment service 108 may map the payment instrument to the customer and, hence, may deduce that the customer is located at the merchant. At that point, the payment service 108 may send the item preference to a device of the second merchant. The second merchant may use this information to enhance the experience of the customer at the second merchant (e.g., "I understand that you prefer your lattes extra hot. Shall I make this one extra hot?").

In other instances, a computing device associated with the merchant (e.g., a POS device, servers of the merchant, etc.) determines when the customer visits physical premises or a digital presence of the merchant. For instance, the device of the customer may include an application (e.g., an application provided by the payment service 108) that communicates with the POS device of the second merchant via near-field communication methods (e.g., Bluetooth, etc.). Therefore, when the customer visits the physical premises of the merchant, for example, the POS device may detect the presence of the customer device. The POS device may accordingly determine that the customer is present. In another example, one or both of the POS device and the customer device may share its location (e.g., GPS coordinates) to one another or to a common service for determining when the devices are located within a threshold proximity of one another.

In another example, the customer may utilize the customer device to "check in" at the merchant location, and the POS device may receive an indication of this check in. When the customer visits a digital presence of the merchant (e.g., a website, etc.), the customer may log in or otherwise provide information (e.g., a cookie on the device) from which the second merchant determines that the customer is at the merchant. Of course, while a few examples are listed, it is to be appreciated that the merchant and/or the payment service 108 may determine when the customer is present at the merchant in any other number of ways. In each instance, after the payment service 108 receives an indication that a particular customer is located at the merchant, the payment service 108 may determine whether to send one or more previously expressed item preferences of the customer to the merchant.

In addition, after engaging in transactions with the merchants 102, one of the customers 104 may desire to receive an instance of a payments application from the payment service 108. FIG. 1 illustrates, at 118, that the customers 104 may send respective payment-application requests to the payment service 108. In response, at 120, the payment service 108 may provide respective instances of the application back to the customer devices. In addition, the payment service 108 may map an identification of the instance of the application to the customer profile, such that previously expressed item preferences of each respective customer is now associated with the respective instance of the application on the respective customer device. For instance, if a user has been using a particular credit card when engaging at transactions at the merchants 102, any item preferences expressed during these transactions may be initially associated with the payment instrument and the user and, after the respective user requests to receive a payments application, may be associated with the instance of the payments application. By associating these pre-collected preferences with the payments application of the customer, when the customer utilizes the application to order items from the merchants, the previously expressed item preferences may be expressed to the merchants.

Figure 2:
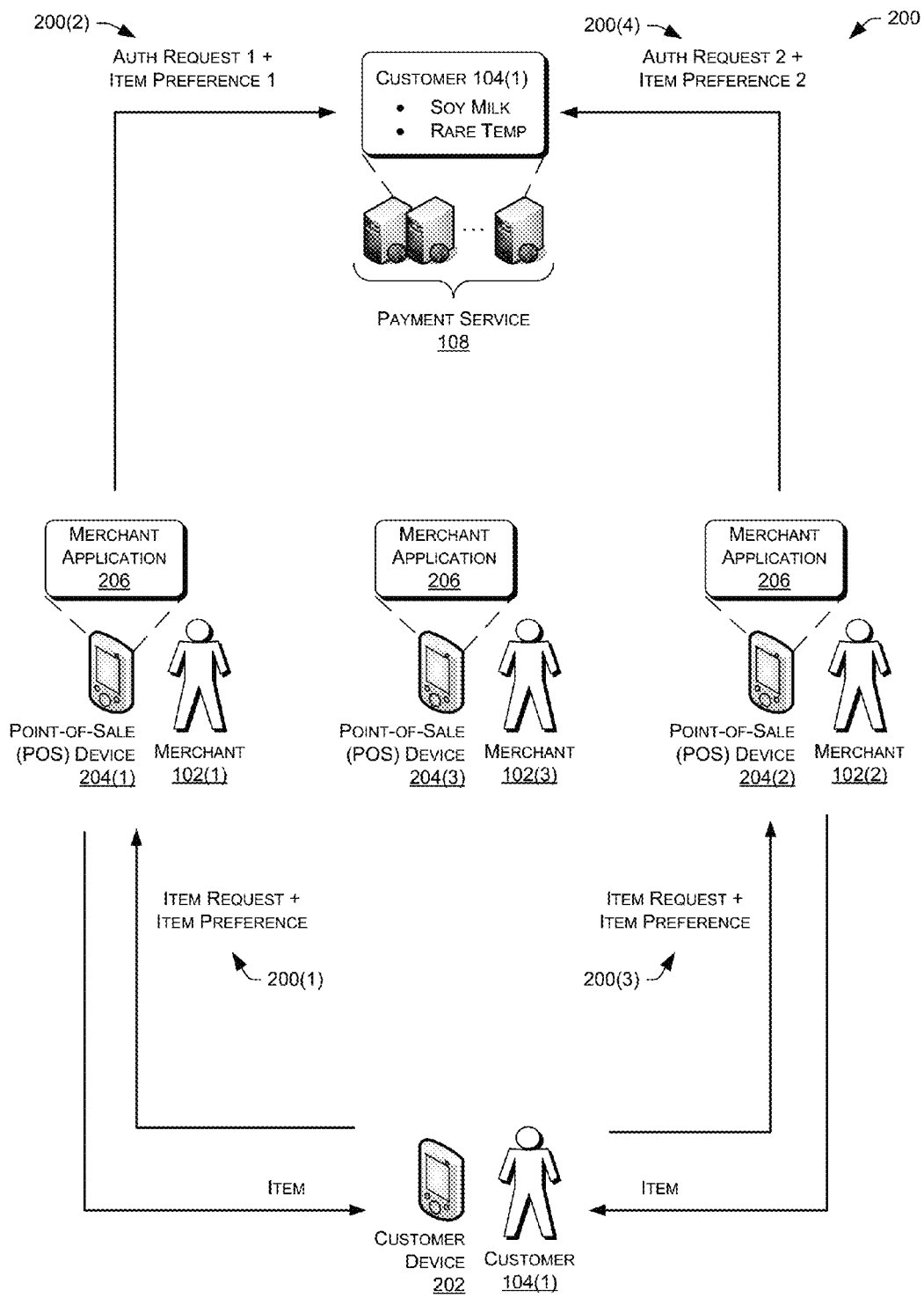
FIG. 2 illustrates a scenario where an example customer expresses a first item preference when engaging in a first transaction with a first merchant and a second item preference when engaging in a second transaction with a second merchant. The merchants provide this information to a payment service, which stores this information in a profile of the user.

FIG. 2 illustrates a scenario 200 where an example customer 104(1) expresses a first item preference when engaging in a first transaction with a first merchant 102(1) and a second item preference when engaging in a second transaction with a second merchant 102(2). The merchants provide this information to the payment service 108, which stores this information in a profile of the user.

First, and as illustrated at 200(1), the customer 104(1) (who is associated with a customer device 202) may request an item from the merchant 102(1) and may express a customization to the item (i.e., an item preference). A POS device 204(1) of the merchant 102(1) may receive this request and the customization and may provide, via a merchant application 206 and at 200(2), a request to authorize a payment instrument of the customer 200(2) to the payment service, along with an indication of the expressed item preference. In instances where the customer 104(1) provides cash, meanwhile, the POS device 204(1) may simply send an indication of the item preference to the payment service. In addition to attempting to authorize the payment instrument of the customer 104(1), the payment service 108 may identify the customer 104(1) and may store an indication of the item preference in association with a profile of the customer 104(1) at the payment service. In this example, for instance, the customer 104(1) has ordered a latte with soy milk from the merchant 102(1) and, in response, the payment service 108 has stored an indication that the customer 104(1) prefers soy milk.

Next, the customer 104(1) visits the second merchant 102(2). As illustrated at 200(3), the customer 104(1) requests an item and expresses a second item preference. In this example, the customer 104(1) orders a steak from the merchant 102(2) and requests that it be prepared at a rare temperature. A POS device 204(2) of the second merchant 102(2) sends, at 200(4), a request to authorize a payment instrument along with an indication of the item preference to the payment service 108. In addition to attempting to authorize the payment instrument, the payment service 108 stores an indication that the customer 104(1) prefers meat prepared at a rare temperature.

Figure 3:
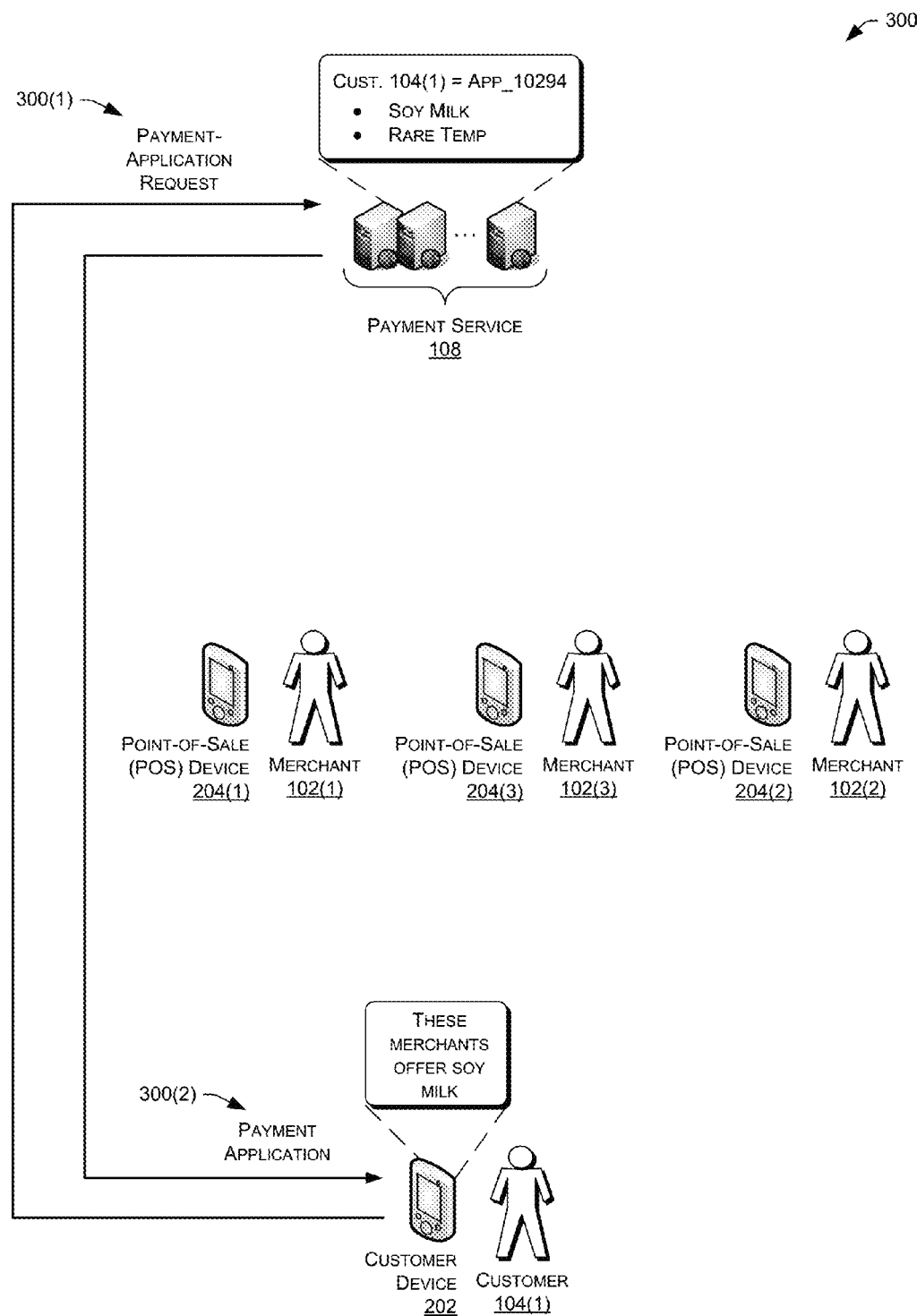
FIG. 3 illustrates a scenario where the example customer requests a payments application from the payment service of FIG. 2, which provides an instance of the application to a device of the user in response. The payment service may associate the instance of the application with the profile of the user and, hence, with the item preferences previously expressed by the user.

FIG. 3 illustrates a scenario 300 where the example customer 104(1) thereafter requests a payments application from the payment service 108. As shown at 300(1), the customer 104(1) may utilize the customer device to request the payments application from the payments service 108. At 300(2), the payments service 108 may send an instance of the application to the customer device 202 and may associate the instance of the application with the profile of the customer 104(1) and, hence, with the item preferences previously expressed by the customer 104(1). As such, the payments application on the customer device 202 is now associated with the item preferences "soy milk" and "rare temperature". The customer 104(1) may now use the payments application to order items from merchants, potentially using any item preferences associated with the customer 104(1). FIG. 3, for instance, illustrates that the application indicates to the customer 104(1) other coffee shops that offer soy milk, potentially in response to the customer 104(1) using the application to search for nearby coffee shops. In another example, when the customer 104(1) orders a steak from a local merchant using the application, the application may query the customer 104(1) as to whether the customer would like that steak prepared at a rare temperature.

Figure 4:
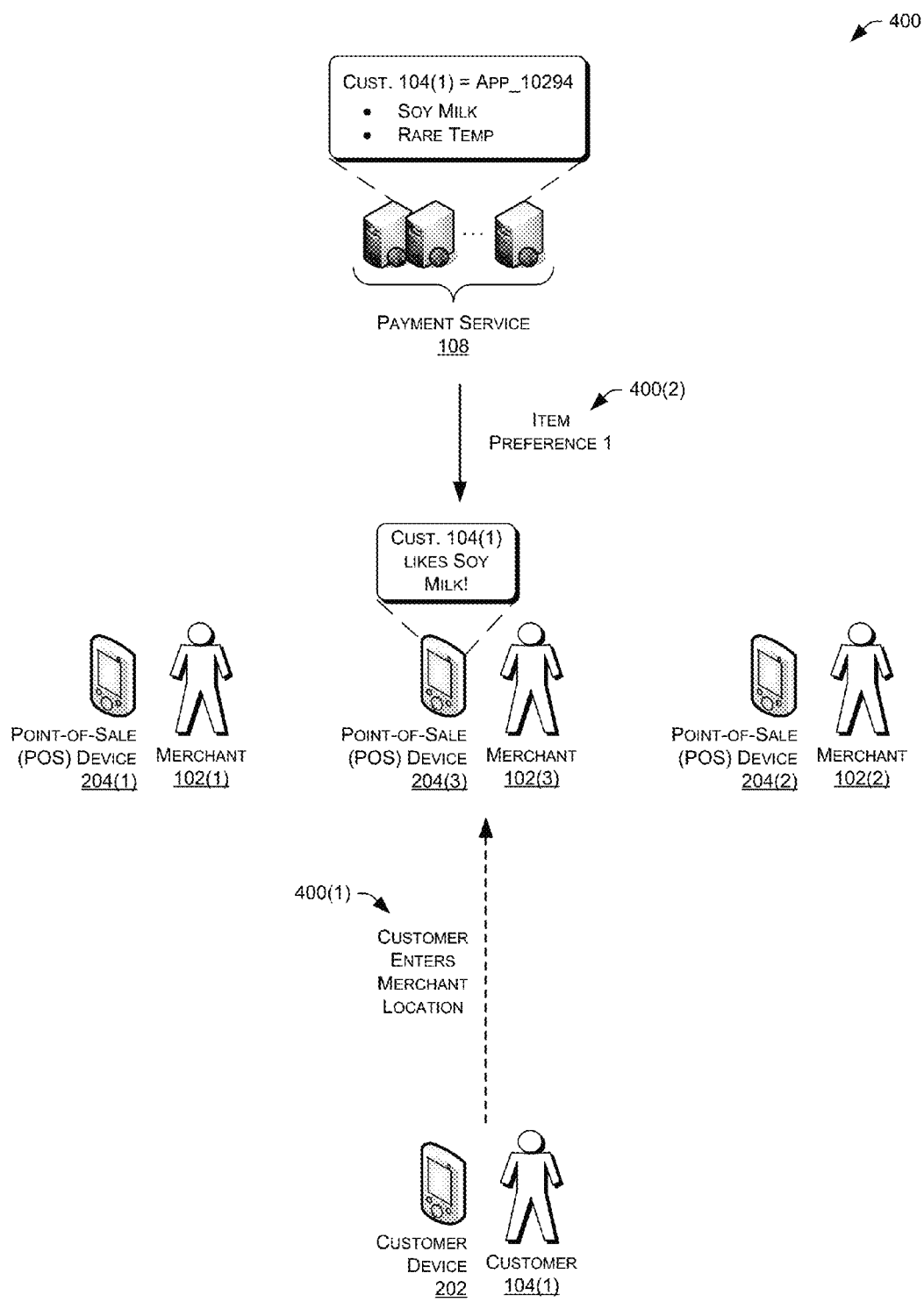
FIG. 4 illustrates an example scenario where the user of FIG. 2 visits a physical premises of a third merchant. In response to determining that the user is at the third merchant, the payment service intelligently propagates one or more item preferences of the user to a device of the third merchant.

FIG. 4 illustrates an example scenario 400 where the customer 104(1) visits a physical premises of a third merchant 102(3) at 400(1). In response to determining that the user is at the third merchant 102(2) (using any of the techniques discussed above) the payment service 108 intelligently propagates, at 400(2), one or more item preferences of the customer 104(1) to a POS device 204(3) of the third merchant 102(3). For instance, the payment service 108 may determine that the third merchant 102(3) offers a class of items (e.g., coffee items) associated with one of the item preferences associated with the customer 104(1) and, in response, may send an indication to the POS device 204(3) of the third merchant 102(3). The merchant 102(3) may then use this information to better service the customer 104(1) (e.g., "I see that you like Soy milk. Would you like us to make your latte with Soy milk?") The item preference associated with the "rare temperature", however, may be associated with a class of items not offered by the merchant 102(3) and, therefore, the payment service 108 may refrain from sending an indication of this item preference to the POS device 204(3).

Figure 5:
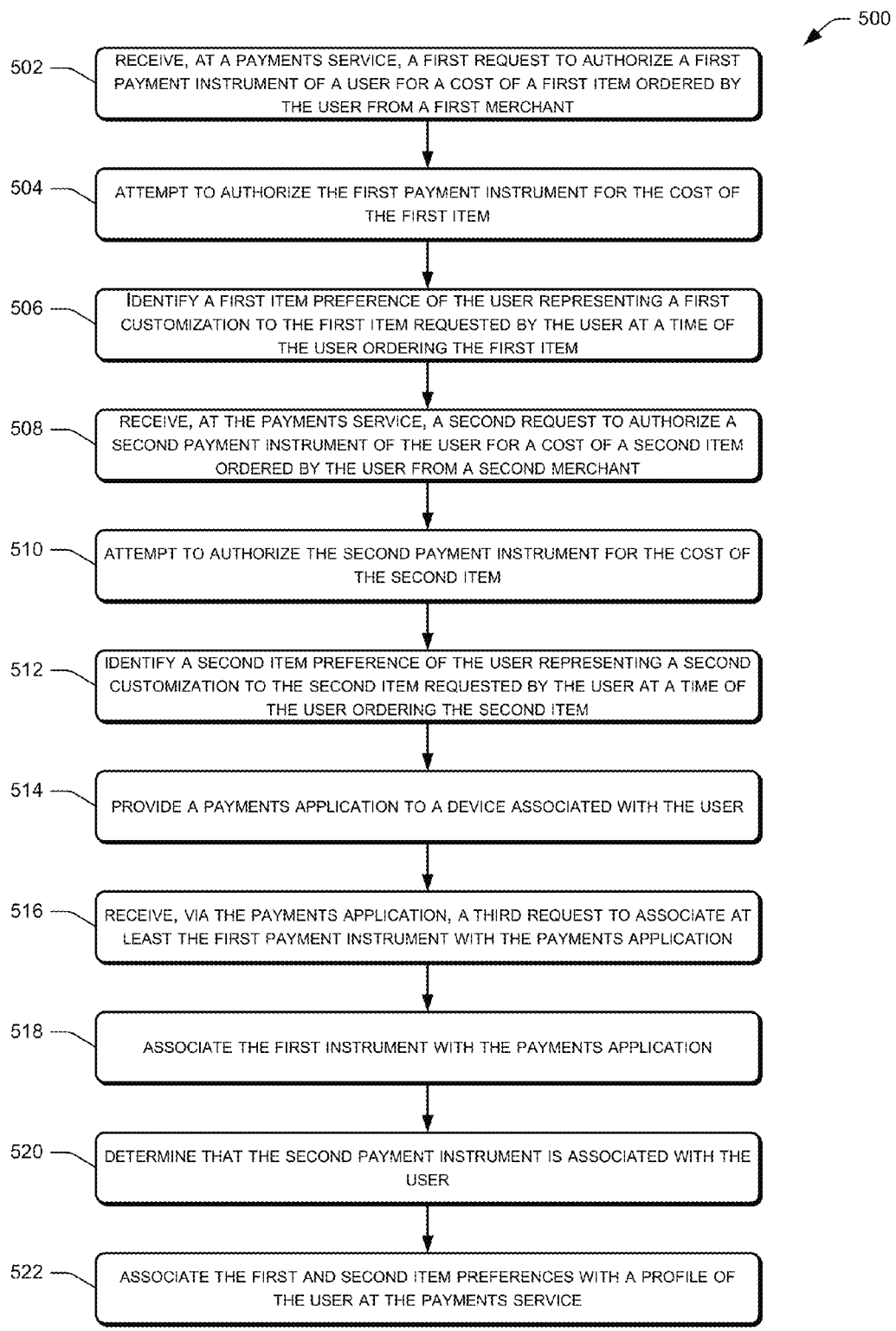
FIG. 5 illustrates a flow diagram of an example process for collecting item preferences of a user, providing a payments application to a device of the user, and associating the item preferences of the user with the payments application.

FIG. 5 illustrates a flow diagram of an example process 500 for collecting item preferences of a user, providing a payments application to a device of the user, and associating the item preferences of the user with the payments application. The process 500 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 502, the process 500 receives, at a payment service, a first request to authorize a first payment instrument of a user for a cost of a first item ordered by the user from a first merchant. At the 504, the process 500 may attempt to authorize the first payment instrument for the cost of the first item. In addition, at 506, the process 500 may identify, from the first request, a first item preference of the user, the first item preference representing a first customization to the first item. In some instances, the user requested the first customization at a time of the user ordering the first item from the first merchant.

At 508, the process 500 receives, at the payment service, a second request to authorize a second payment instrument of the user for a cost of a second item ordered by the user from a second merchant. At 510, the process 500 attempts to authorize the second payment instrument for the cost of the second item and, at 512, identifies, from the second request, a second item preference of the user. This second item preference may represent a second customization to the second item, the second customization requested by the user at a time of the user ordering the second item from the second merchant.

At 514, the process 500 provides, at least partly after attempting to authorize the first and second payment instruments, a payments application to a device associated with the user. The payments application may be associated with the payment service and may allow the user to interact with merchants by, for instance, ordering items from merchants, perusing menus and other attributes of the merchants, and the like. At 516, the process 500 receives, via the payments application and from the device of the user, a third request to associate at least the first payment instrument with the payments application. At 518, the process 500 associates the first payment instrument with the payments application. In addition, at 520, the process 500 determines that the second payment instrument is associated with the user (e.g., based on a name of the payment instruments, billing address, etc.). At 522, the process 500 proceeds to associate the first and second item preferences with a profile of the user at the payment service. Therefore, after requesting the payments application from the payment service, the process 500 may join the preferences expressed during the first and second transactions in the profile of the user at the payment service.

Figure 6:
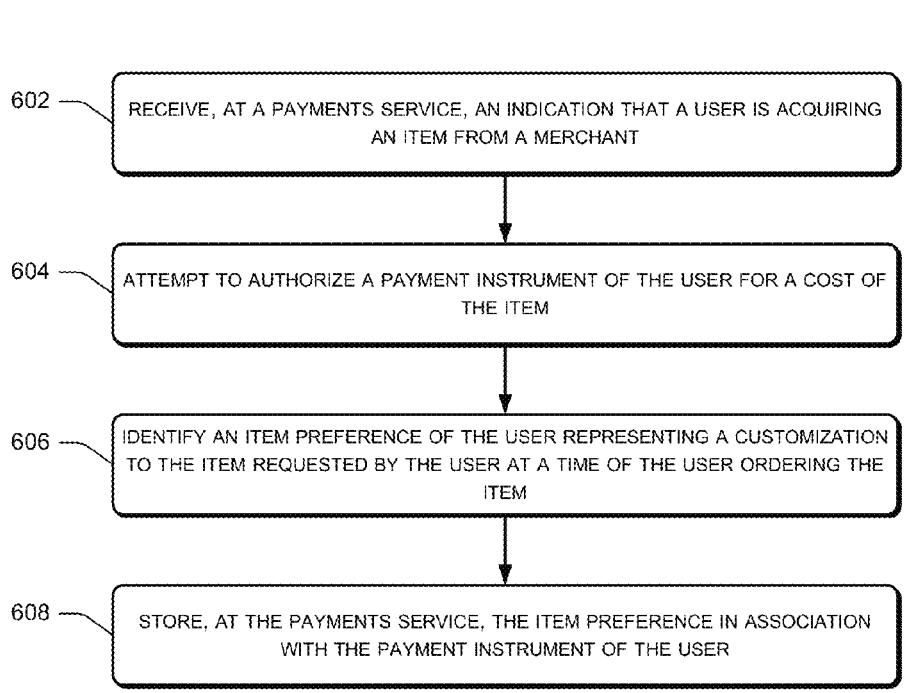
FIG. 6 illustrates a flow diagram of an example process for associating an item preference with a payment instrument of a user that expressed the item preference.

FIG. 6 illustrates a flow diagram of an example process 600 for associating an item preference with a payment instrument of a user that expressed the item preference. At 602, the process 600 receives, at a payment service, an indication that a user is acquiring an item from a merchant. At 604, the process 600 attempts to authorize a payment instrument of the user for a cost of the item. At 606, the process 600 identifies, from the indication, an item preference of the user, the item preference representing a customization to the item requested by the user at a time of the user ordering the item from the merchant. Finally, at 608, the process 600 stores, at the payment service, the item preference in association with the payment instrument of the user. Therefore, when the user later uses the payment instrument to engage in a transaction with a different merchant, the payment service may send an indication of the expressed item preference to a device of the different merchant, who may use the preference to enhance an experience of the user at the different merchant.

Figure 7:
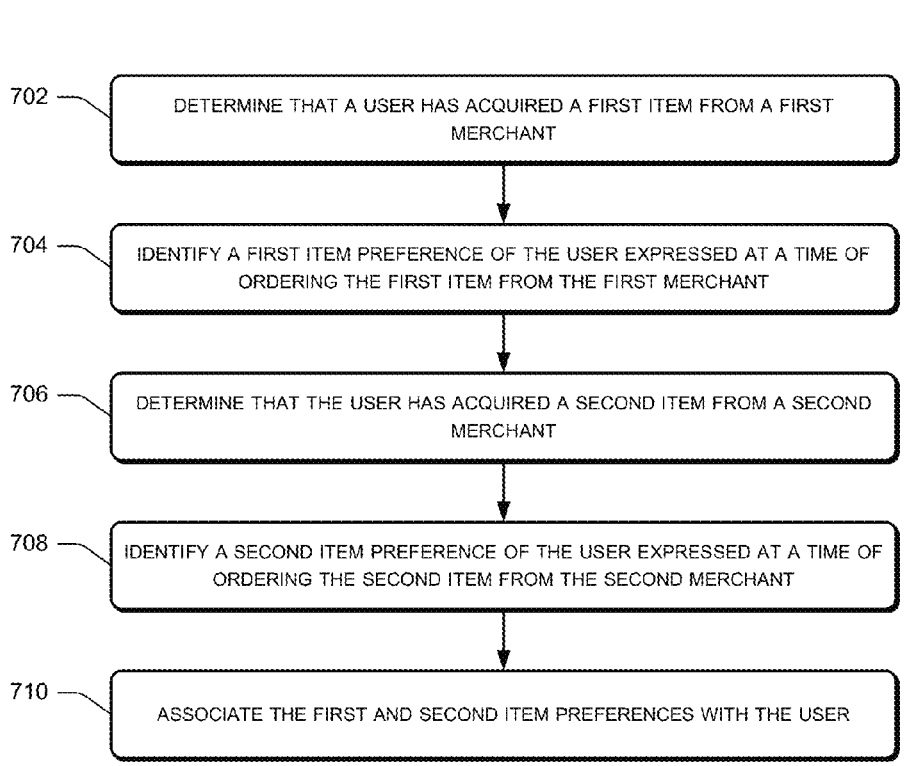
FIG. 7 illustrates a flow diagram of an example process for collecting multiple item preferences expressed at different merchants and associating these item preferences with a user that expressed them.

FIG. 7 illustrates a flow diagram of an example process 700 for collecting multiple item preferences expressed at different merchants and associating these item preferences with a user that expressed them. At 702, the process 700 determines that a user has acquired a first item from a first merchant. At 704, the process 700 identifies a first item preference of the user, the user having expressed the first item preference at a time of ordering the first item from the first merchant. For instance, when a merchant provides an indication of the transaction to a payment service (potentially along with a request to authorize a payment instrument of the user), the merchant may send receipt data to the payment service, which may identify the preference from received receipt data.

At 706, the process 700 may determine that the user has acquired a second item from a second merchant and, at 708, may identify a second item preference of the user, the user having expressed the second item preference at a time of ordering the second item from the second merchant. At 710, the process 700 may associate the first and second item preferences with the user, such as with a profile of the user at a payment service. The payment service may then use these preference to intelligently propagate these item preferences to different merchants when the user visits the different merchants.

Figure 8:
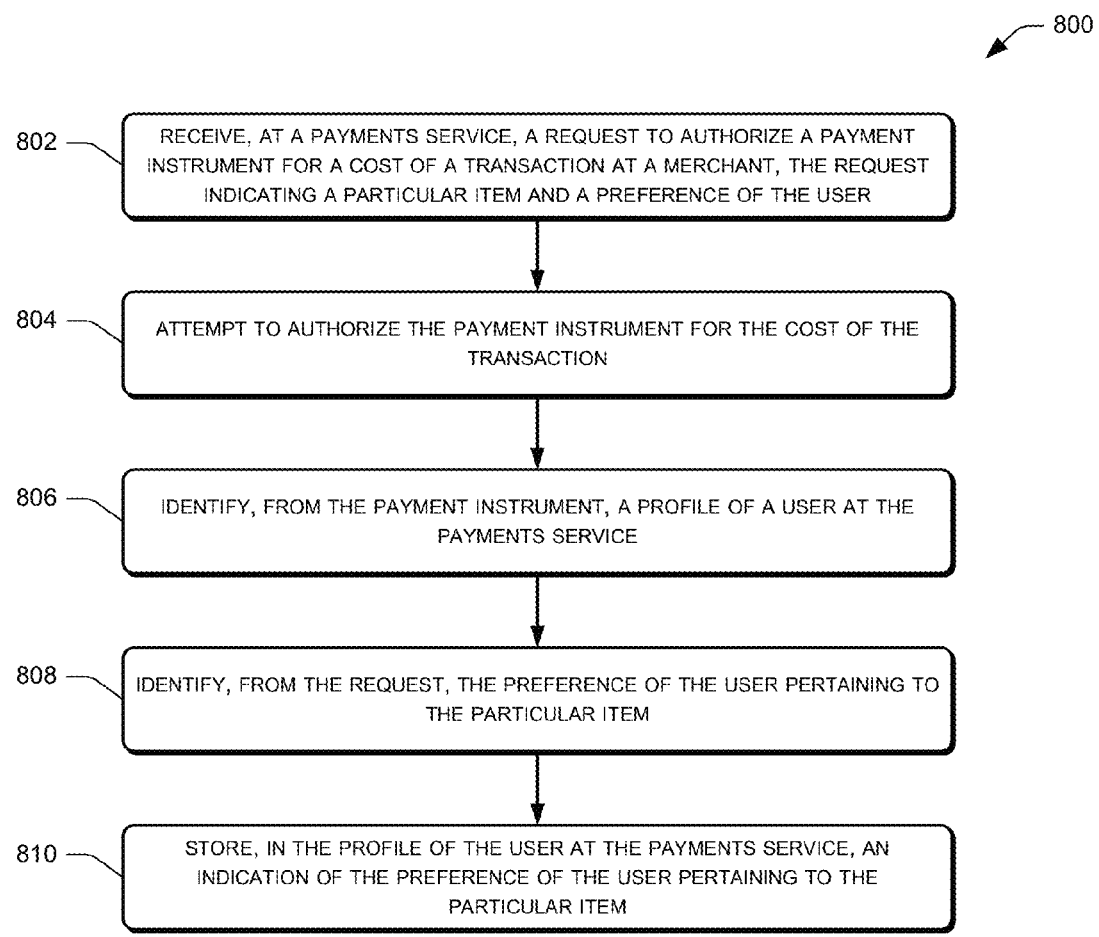
FIG. 8 illustrates a flow diagram of an example process for receiving a request to authorize a payment instrument for a transaction, identifying a user associated with the instrument, and associating, with the user, an item preference expressed in the transaction.

FIG. 8 illustrates a flow diagram of an example process 800 for receiving a request to authorize a payment instrument for a transaction, identifying a user associated with the instrument, and associating, with the user, an item preference expressed in the transaction. At 802, the process 800 receives, at a payment service, a request to authorize a payment instrument for a cost of a transaction at a merchant. This payment instrument may be associated with a user and the request may indicate a particular item ordered by the user as part of the transaction along with a preference of the user pertaining to the particular item. At 804, the process 800 attempts to authorize the payment instrument for the cost of the transaction. At 806, the process 800 identifies, from the payment instrument, a profile of the user at the payment service. For instance, the process 800 may use a name, billing address, and other information associated with the payment instrument to identify the user and, hence, the profile of the user at the payment service. At 808, the process 800 may also identify, from the request, the preference of the user pertaining to the particular item. Finally, at 810, the process 800 may store, in the profile of the user at the payment service, an indication of the preference of the user pertaining to the particular item.

Figure 9:
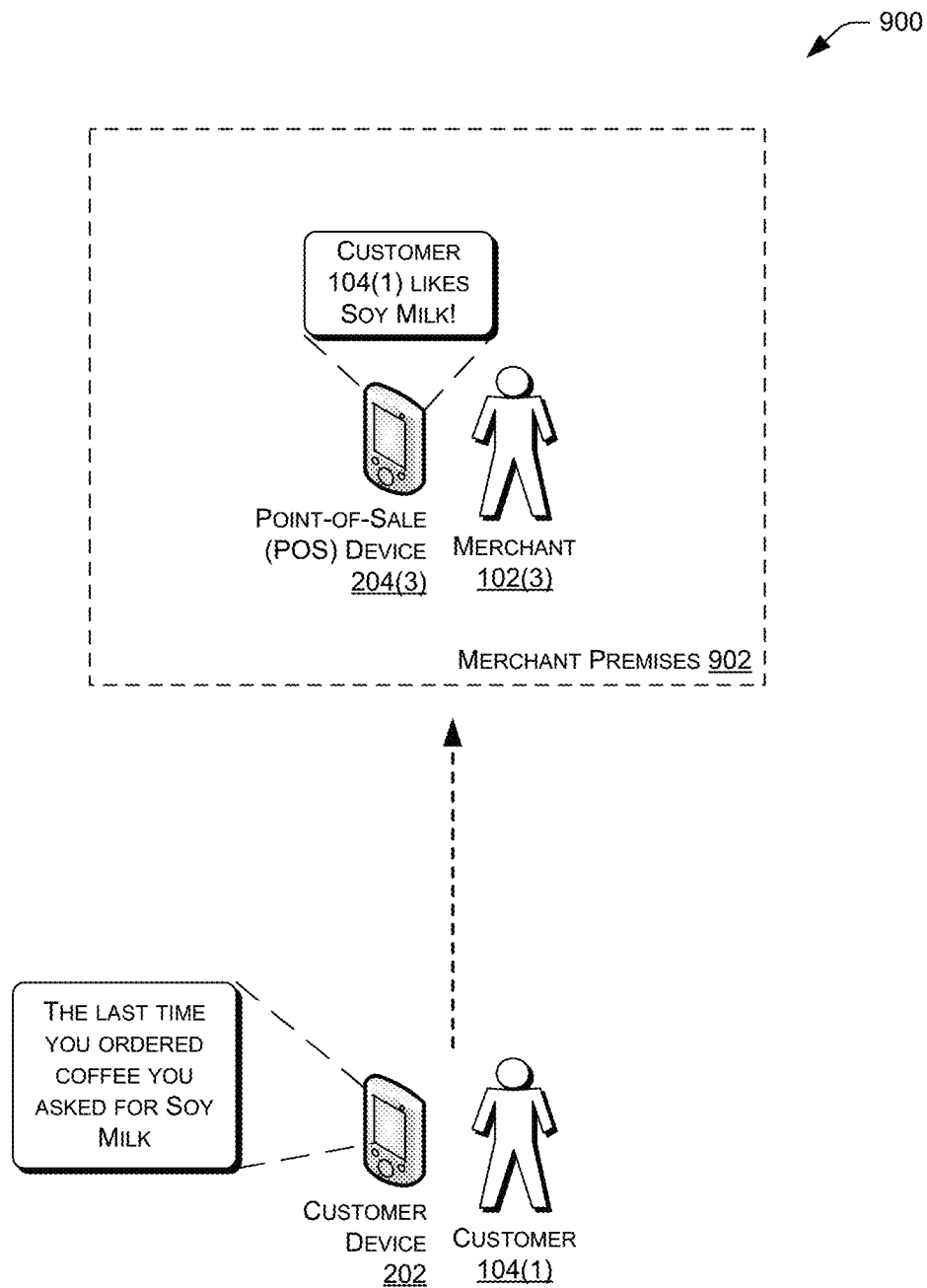
FIG. 9 illustrates an example scenario where a user visits a physical premises of a merchant and, in response, the payment service provides information regarding an item preference of the user to a device of the merchant and/or a device of the customer.

FIG. 9 illustrates an example scenario 900 where the customer 104(1) visits a physical premises 902 of the merchant 102(3) and, in response, the payment service 108 provides information regarding an item preference of the customer 104(1) to the POS device 204(3) of the merchant 102(3) and/or to the device 202 of the customer 104(1). Here, for instance, envision that the merchant 102(3) comprises a coffee shop and the user has previously expressed a preference for soy milk when shopping at the first example merchant 102(1). In response to the payment service 108 determining that the customer 104(1) is located at the merchant 102(3), and that the merchant 102(3) is a coffee shop, the payment service 108 may send an indication of the customer's preference for soy milk to the POS device 204(3). The merchant 102(3) is therefore able to offer this preference to the customer 104(1) without the customer needing request it.

In addition, the payment application executing on the customer device 202 may surface an indication of this item preference. For instance, in this example the payment application indicates, to the customer, that he previously requested soy milk when last ordering a coffee drink. In addition or in the alternative, the payment application could indicate to the user whether the merchant 102(3) offers soy milk, a charge for soy milk at the merchant 102(3), or the like.

Figure 10:
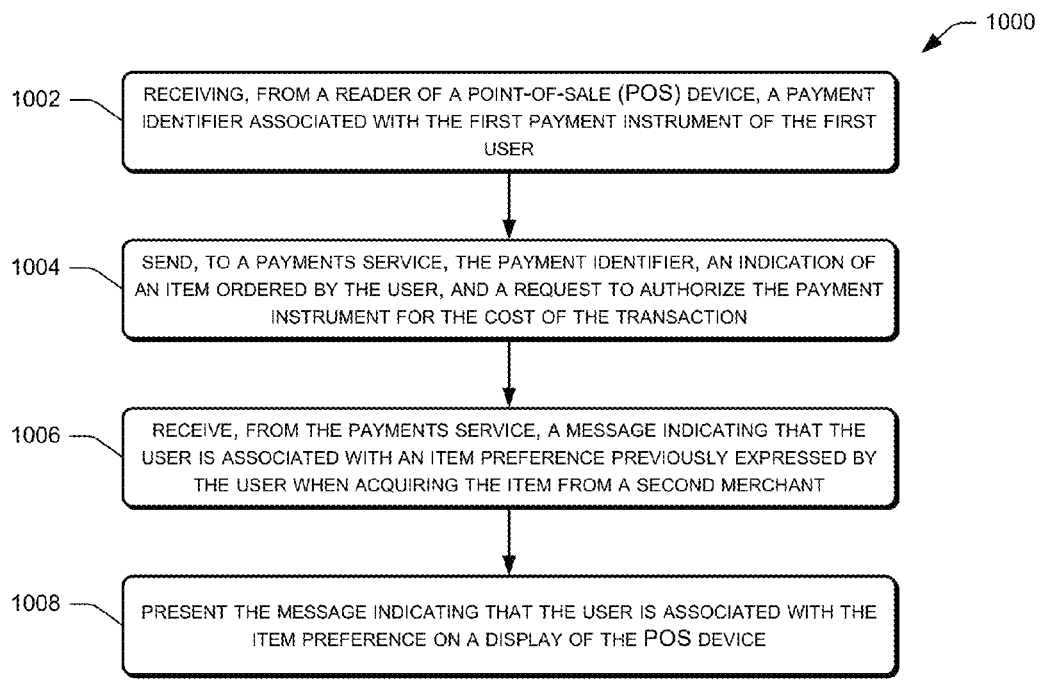
FIG. 10 illustrates a flow diagram of an example process for requesting, by a point-of-sale (POS) device of a merchant, a payment service to authorize a payment instrument of a customer for a cost of a transaction and receiving, from the payment service, an indication of an item preference associated with the customer.

FIG. 10 illustrates a flow diagram of an example process 1000 for requesting, by a point-of-sale (POS) device of a merchant, a payment service to authorize a payment instrument of a customer for a cost of a transaction and receiving, from the payment service, an indication of an item preference associated with the customer. At 1002, the process 1000 receives, from a reader of a POS device, a payment identifier associated with a first payment instrument of the first user, the first payment instrument used to satisfy a cost of a transaction between the user and a first merchant. At 1004, the process 1000 sends, to a payment service, the payment identifier, an indication of an item ordered by the user as part of the transaction between the user and the merchant, and a request to authorize the payment instrument for the cost of the transaction between the user and the merchant.

At 1006, the process 1000 receives, from the payment service, a message indicating that the user is associated with an item preference pertaining to the item, the user having previously expressed the item preference when acquiring the item from a second merchant. As described above, the item preference may comprise a customization to the item previously requested by the user. At 1008, the process 1000 may present the message indicating that the user is associated with the item preference on a display of the POS device for informing an operator of the POS device of this preference. The operator may then suggest the preference to the user or may utilize this information in another way.

Figure 11:
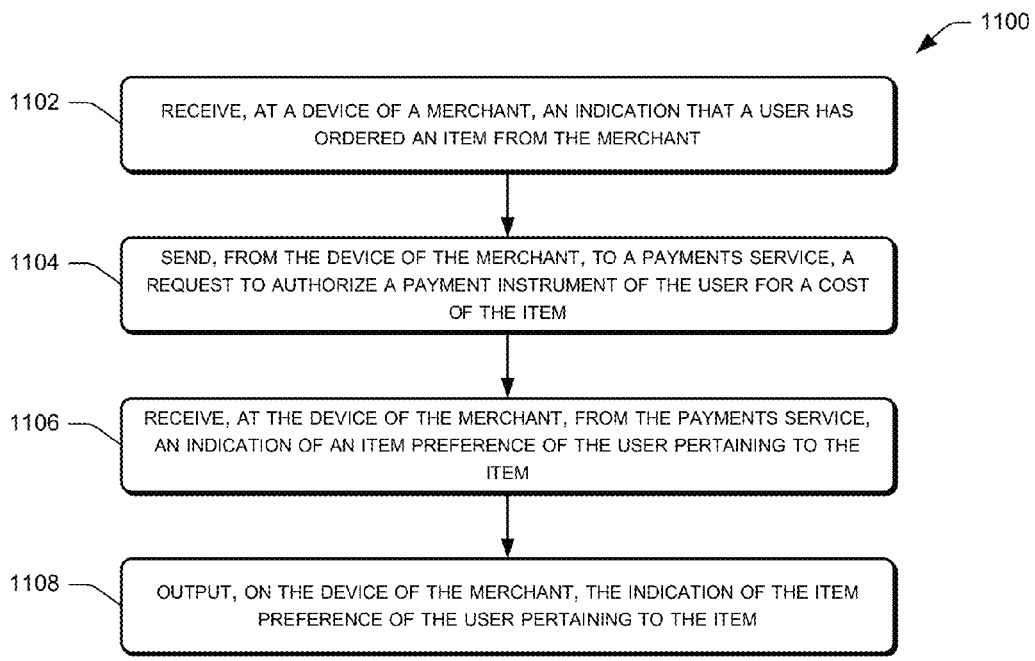
FIG. 11 illustrates a flow diagram of an example process for outputting an indication of an item preference of a user on a POS device of a merchant.

FIG. 11 illustrates a flow diagram of an example process 1100 for outputting an indication of an item preference of a user on a POS device of a merchant. At 1102, the process 1100 receives, at a device of a merchant, an indication that a user has ordered an item from the merchant. At 1104, the process 1100 sends, from the device of the merchant, to a payment service, a request to authorize a payment instrument of the user for a cost of the item. At 1106, the process 1100 receives, at the device of the merchant and from the payment service, an indication of an item preference of the user pertaining to the item. Finally, at 1108, the process 1100 outputs, on the device of the merchant, the indication of the item preference of the user pertaining to the item.

Figure 12:
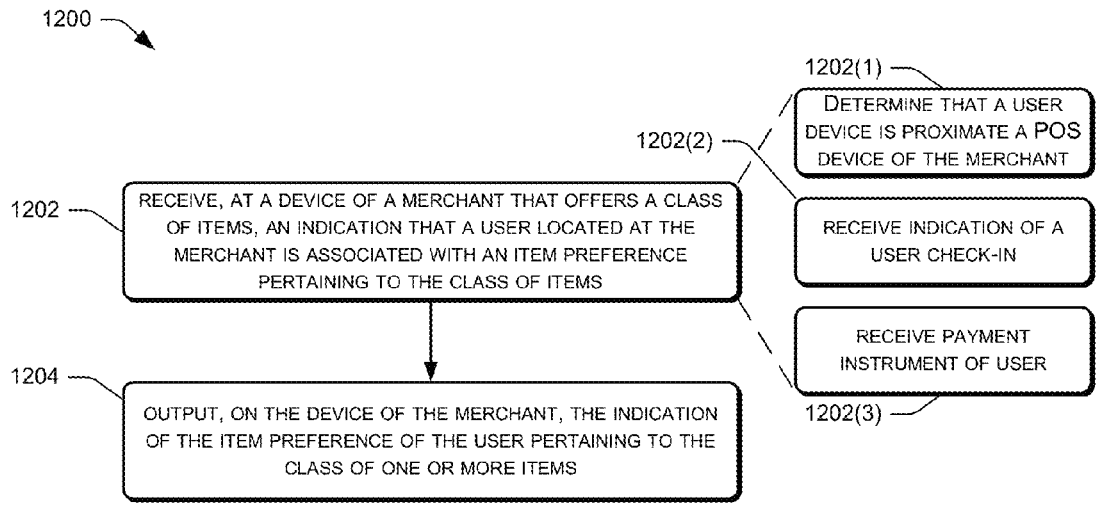
FIG. 12 illustrates a flow diagram of an example process for receiving, at a device of a merchant, an indication that a user located at the merchant is associated with an item preference and outputting the indication on the device of the merchant.

FIG. 12 illustrates a flow diagram of an example process 1200 for receiving, at a device of a merchant, an indication that a user located at the merchant is associated with an item preference and outputting the indication on the device of the merchant. At 1202, the process 1200 receives, at a device of a merchant that offers a class of one or more items, an indication that a user located at the merchant is associated with an item preference pertaining to the class of one or more items. As described above, the user may have previously expressed the item preference when interacting with a different merchant. Also as described above, the merchant may determine that the user is located at the merchant in any number of ways. For instance, a block 1202(1) indicates that the merchant device may determine that a device of the user is proximate to the merchant device. A block 1202(2), meanwhile, indicates that the merchant device may receive an indication that the user has checked-in to the merchant, such as on a social network. In a third example, a block 1202(3) indicates that the merchant device may receive a payment instrument of the user and may determine that the user is located at the merchant based on this information.

At 1204, the process 1200 may output, on the device of the merchant, the indication of the item preference of the user pertaining to the class of one or more items. This may include presenting an indication on a display of the device of the merchant, outputting an audible indication on a speaker of the device of the merchant, or the like.

Figure 13:
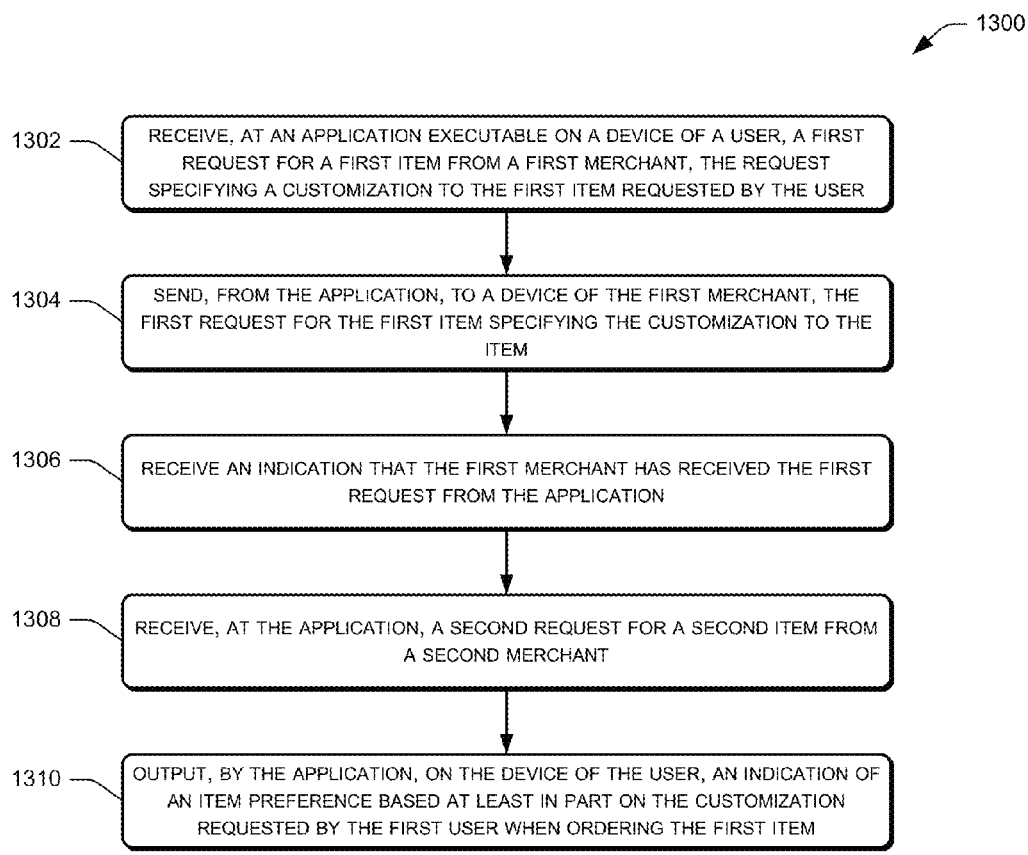
FIG. 13 illustrates a flow diagram of an example process for outputting, on a device of a user, an indication of an item preference associated with the customer.

FIG. 13 illustrates a flow diagram of an example process 1300 for outputting, on a device of a user, an indication of an item preference associated with the customer. At 1302, the process 1300 receives, at an application executable on a device of a user, a first request for a first item from a first merchant, the request specifying a customization to the first item requested by the user. At 1304, the process 1300 sends, from the application, to a device of the first merchant, the first request for the first item specifying the customization to the item. At 1306, the process 1300 receives an indication that the first merchant has received the first request from the application. At 1308, the process 1300 receives, at the application, a second request for a second item from a second merchant.

At 1310, the process 1300 outputs, by the application and on the device of the user, an indication of an item preference, the item preference based at least in part on the customization requested by the first user when ordering the first item from the first merchant. For example, in instances where the first and second item comprise the same item or a same class of item, the application may suggest that the user request the item preference when ordering the second item. For instance, the indication may comprise an inquiry as to whether the customization should also be applied to the second item when requesting the second item from the second merchant.

Figure 14:
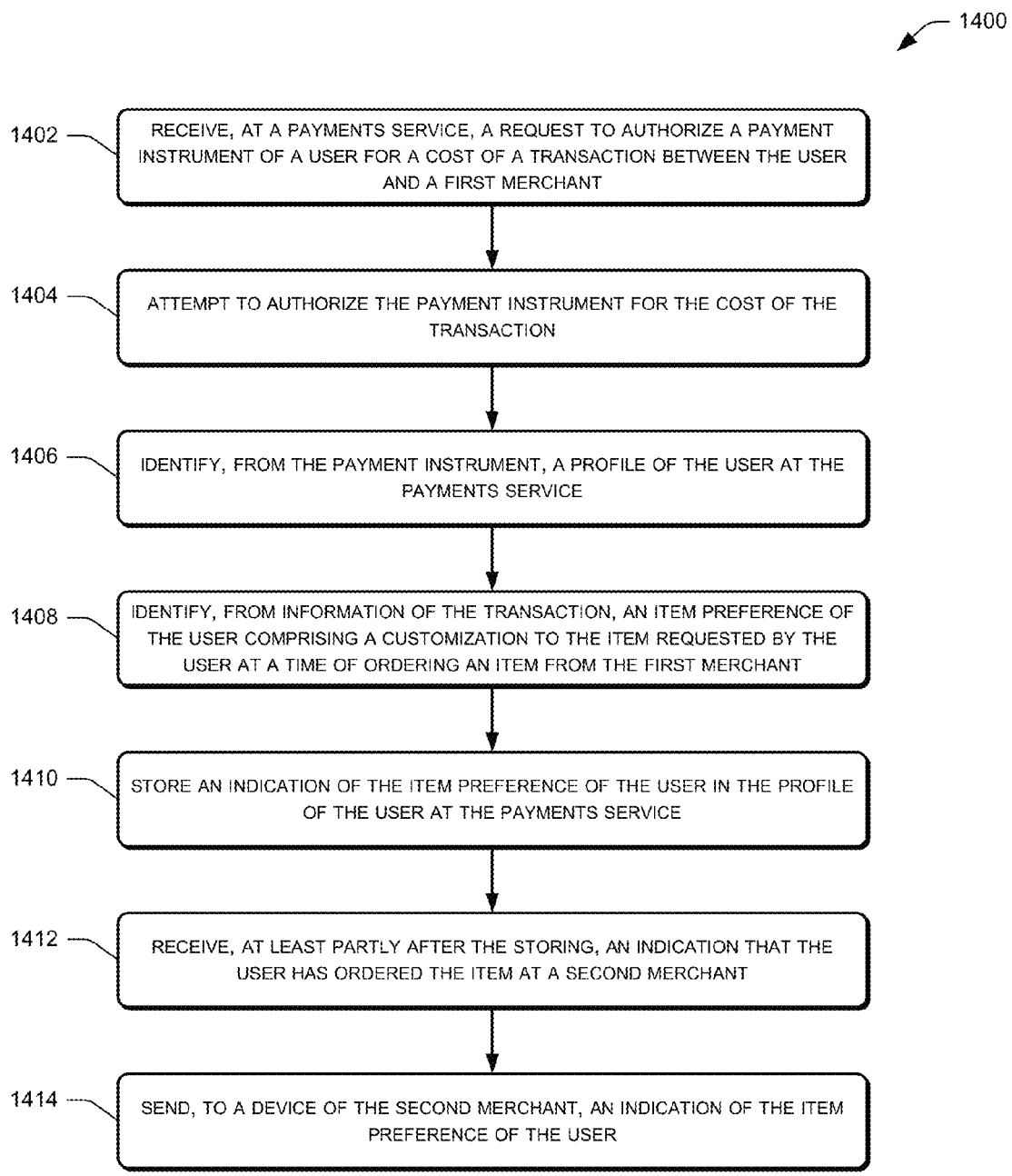
FIG. 14 illustrates a flow diagram of an example process for collecting an item preference of a user expressed at a first merchant and intelligently propagating this item preference to a second merchant.

FIG. 14 illustrates a flow diagram of an example process 1400 for collecting an item preference of a user expressed at a first merchant and intelligently propagating this item preference to a second merchant. At 1402, the process 1400 receives, at a payment service, a request to authorize a payment instrument of a user for a cost of a transaction between the user and a first merchant, the request indicating information pertaining to the transaction. At 1404, the process 1400 attempts to authorize the payment instrument for the cost of the transaction. At 1406, the process 1400 identifies, from the payment instrument, a profile of the user at the payment service. At 1408, the process 1400 identifies, from the information, an item preference of the user pertaining to an item acquired by the user in the transaction, the item preference comprising a customization to the item requested by the user at a time of ordering the item from the first merchant.

At 1410, the process 1400 stores an indication of the item preference of the user in the profile of the user at the payment service. At 1412, the process 1400 receives, at least partly after the storing, an indication that the user has ordered the item at a second merchant. At 1414, and in response, the process 1400 sends, to a device of the second merchant, an indication of the item preference of the user.

Figure 15:
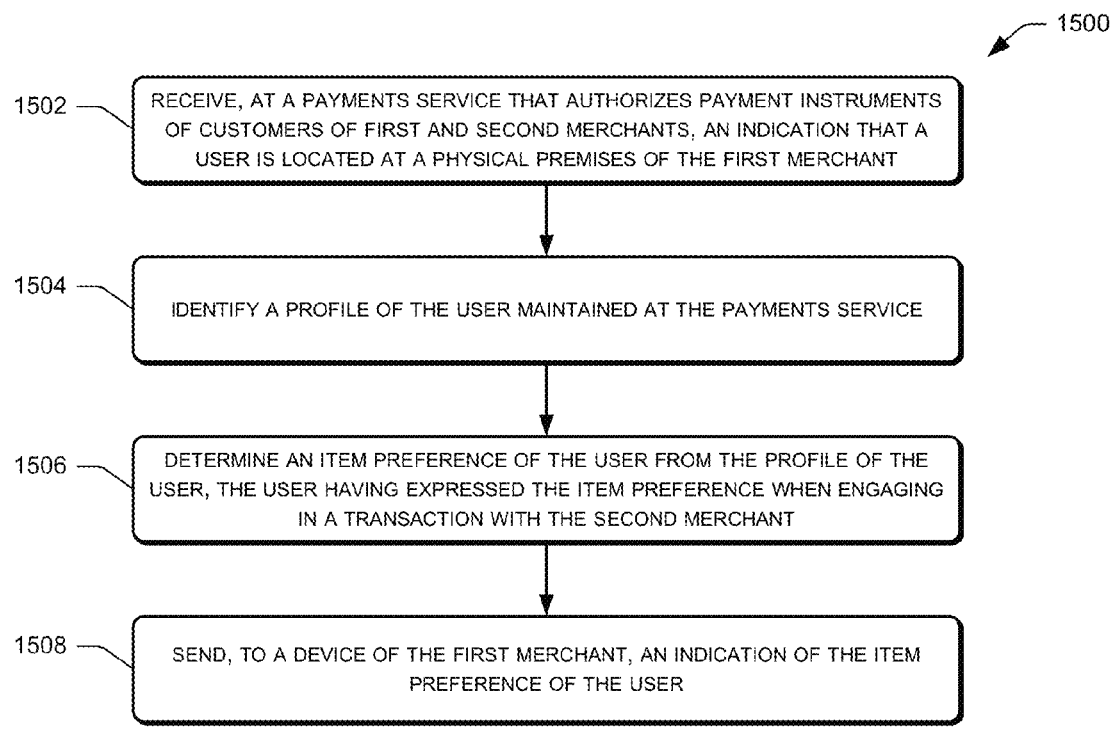
FIG. 15 illustrates a flow diagram of an example process for receiving, at a payment service, an indication that a user is located at a particular merchant and sending, to a device of the merchant, an indication of an item preference of the user in response.

FIG. 15 illustrates a flow diagram of an example process 1500 for receiving, at a payment service, an indication that a user is located at a particular merchant and sending, to a device of the merchant, an indication of an item preference of the user in response. At 1502, the process 1500 receives, at a payment service that authorizes payment instruments of customers of first and second merchants, an indication that a user is located at a physical premises of the first merchant. Again, the process 1500 may make this determination in any number of ways. At 1504, the process 1500 identifies a profile of the user maintained at the payment service. At 1506, the process 1500 determines an item preference of the user from the profile of the user, the user having expressed the item preference when engaging in a transaction with the second merchant. At 1508, the process 1500 sends, to a device of the first merchant, an indication of the item preference of the user. The process 1500 may send this indication to the device of the first merchant as part of a checkout process for a transaction between the user and the first merchant or, in other instances, prior to a transaction between the user and the first merchant.

Figure 16:
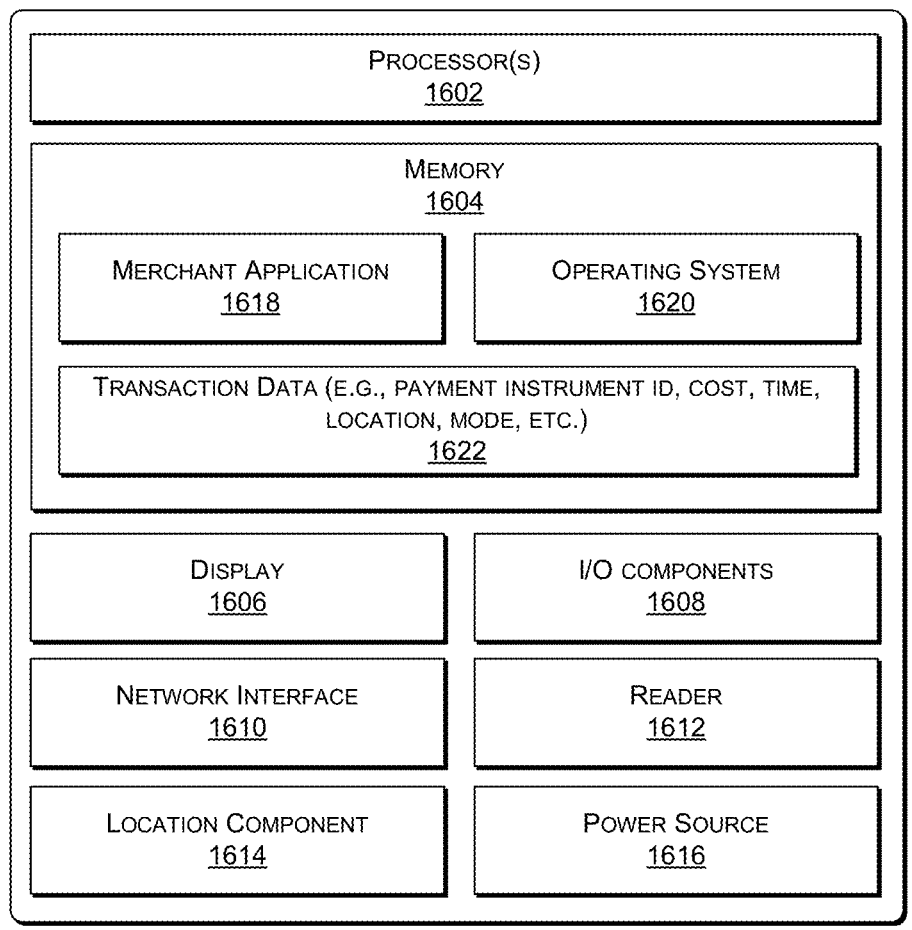
FIG. 16 illustrates select components of a POS device that merchants described herein may utilize.

FIG. 16 illustrates select example components of an example POS device 1600 according to some implementations. The POS device 1600 may be any suitable type of computing device, e.g., mobile, semi-mobile, semi-stationary, or stationary. Some examples of the POS device 1600 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 1600 includes at least one processor 1602, memory 1604, a display 1606, one or more input/output (I/O) components 1608, one or more network interfaces 1610, at least one card reader 1612, at least one location component 1614, and at least one power source 1616. Each processor 1602 may itself comprise one or more processors or processing cores. For example, the processor 1602 can be implemented as one or more microprocessors, microcomputers, microcontrollers, digital signal processors, central processing units, state machines, logic circuitries, and/or any devices that manipulate signals based on operational instructions. In some cases, the processor 1602 may be one or more hardware processors and/or logic circuits of any suitable type specifically programmed or configured to execute the algorithms and processes described herein. The processor 1602 can be configured to fetch and execute computer-readable processor-executable instructions stored in the memory 1604.

Depending on the configuration of the POS device 1600, the memory 1604 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1604 may include, but is not limited to, RAM, ROM, EEPROM, flash memory, solid-state storage, magnetic disk storage, optical storage, and/or other computer-readable media technology. Further, in some cases, the POS device 1600 may access external storage, such as RAID storage systems, storage arrays, network attached storage, storage area networks, cloud storage, or any other medium that can be used to store information and that can be accessed by the processor 1602 directly or through another computing device or network. Accordingly, the memory 1604 may be computer storage media able to store instructions, modules or components that may be executed by the processor 1602. Further, when mentioned, non-transitory computer-readable media exclude media such as energy, carrier signals, electromagnetic waves, and signals per se.

The memory 1604 may be used to store and maintain any number of functional components that are executable by the processor 1602. In some implementations, these functional components comprise instructions or programs that are executable by the processor 1602 and that, when executed, implement operational logic for performing the actions and services attributed above to the POS device 1600. Functional components of the POS device 1600 stored in the memory 1604 may include a merchant application 1618, discussed above. The merchant application 1618 may present an interface on the POS device 1600 to enable the merchant to conduct transactions, receive payments, and so forth, as well as communicating with the payment service 108 for processing payments and sending transaction information. Further, the merchant application 1618 may present an interface to enable the merchant to manage the merchant's account, and the like.

Additional functional components may include an operating system 1620 for controlling and managing various functions of the POS device 1600 and for enabling basic user interactions with the POS device 1600. The memory 1604 may also store transaction data 1622 that is received based on the merchant associated with the POS device 1600 engaging in various transactions with customers, such as the example customers 104 from FIG. 1.

In addition, the memory 1604 may also store data, data structures and the like, that are used by the functional components. For example, this data may include item information that includes information about the items offered by the merchant, which may include images of the items, descriptions of the items, prices of the items, and so forth. Depending on the type of the POS device 1600, the memory 1604 may also optionally include other functional components and data, which may include programs, drivers, etc., and the data used or generated by the functional components. Further, the POS device 1600 may include many other logical, programmatic and physical components, of which those described are merely examples that are related to the discussion herein.

The network interface(s) 1610 may include one or more interfaces and hardware components for enabling communication with various other devices over the network or directly. For example, network interface(s) 1610 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 16 further illustrates that the POS device 1600 may include the display 1606 mentioned above. Depending on the type of computing device used as the POS device 1600, the display 1606 may employ any suitable display technology. For example, the display 1606 may be a liquid crystal display, a plasma display, a light emitting diode display, an OLED (organic light-emitting diode) display, an electronic paper display, or any other suitable type of display able to present digital content thereon. In some examples, the display 1606 may have a touch sensor associated with the display 1606 to provide a touchscreen display configured to receive touch inputs for enabling interaction with a graphic interface presented on the display 1606. Accordingly, implementations herein are not limited to any particular display technology. Alternatively, in some examples, the POS device 1600 may not include the display 1606, and information may be present by other means, such as aurally.

The I/O components 1608, meanwhile, may include speakers, a microphone, a camera, and various user controls (e.g., buttons, a joystick, a keyboard, a keypad, etc.), a haptic output device, and so forth.

In addition, the POS device 1600 may include or may be connectable to a payment instrument reader 1612. In some examples, the reader 1612 may plug in to a port in the merchant device, such as a microphone/headphone port, a data port, or other suitable port. In other instances, the reader 1612 is integral with the entire POS device 1600. The reader may include a read head for reading a magnetic strip or chip of a payment card, and further may include encryption technology for encrypting the information read from the magnetic strip. Alternatively, numerous other types of card readers may be employed with the POS devices 1600 herein, depending on the type and configuration of a particular POS device 1600.

The location component 1614 may include a GPS device able to indicate location information, or the location component 1614 may comprise another other location-based sensor. The POS device 1600 may also include one or more additional sensors (not shown), such as an accelerometer, gyroscope, compass, proximity sensor, and the like. Additionally, the POS device 1600 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    receiving, at a payment service, from a first merchant device, a first request to authorize a first payment instrument of a user for a cost of a first item ordered by the user from a first merchant associated with the first merchant device, the first request including at least first information received by a first card reader from the first payment instrument;
    attempting to authorize the first payment instrument for the cost of the first item;
    identifying, from the first request, a first item preference of the user, the first item preference representing a first customization to the first item, the first customization requested by the user at a time of the user ordering the first item from the first merchant;
    receiving, at the payment service, from a second merchant device, a second request to authorize a second payment instrument of the user for a cost of a second item ordered by the user from a second merchant associated with the second merchant device, the second request including at least second information received by a second card reader from the second payment instrument;
    attempting to authorize the second payment instrument for the cost of the second item;
    identifying, from the second request, a second item preference of the user, the second item preference representing a second customization to the second item, the second customization requested by the user at a time of the user ordering the second item from the second merchant;
    causing, at least partly after attempting to authorize the first payment instrument and the second payment instrument, a payments application to be sent to a device associated with the user, the payments application associated with the payment service;
    receiving, via the payments application stored on the device associated with the user, a third request to associate at least the first payment instrument with the payments application;
    at least partly in response to receiving the third request:
        associating the first payment instrument with the payments application;
        associating the first payment instrument with a profile of the user at the payment service;
        associating the first item preference with the profile of the user at the payment service;
        determining, based at least in part on the second information, that the second payment instrument is associated with the user; and
        associating, based at least in part on determining that the second payment instrument is associated with the user; the second item preference with the profile of the user at the payment service.

2. The method as recited in claim 1, wherein the first item preference comprises a size of the first item, an ingredient to include or not include in the first item, a preparation type of the first item, a color of the first item, or a flavor of the first item.

3. The method as recited in claim 1, further comprising:
    receiving, at the payment service, an indication that the user is acquiring a third item from a third merchant;
    attempting to authorize the first payment instrument for a cost of the third item;
    identifying, from the indication, a third item preference of the user, the third item preference representing a third customization to the third item, the third customization requested by the user at a time of the user ordering the third item from the third merchant; and
    associating the third item preference with the profile of the user at the payment service.

4. The method as recited in claim 1, further comprising:
    receiving an indication that the user is located at a physical premises of a third merchant; and
    sending at least one of the first item preference or the second item preference to a device associated with the third merchant.

5. A method comprising:
    causing an instance of a payments application to be sent to a device associated with a user, the payments application enabling the user to engage in transactions with merchants that utilize a payment service to authorize payment instruments;
    receiving, via the instance of the payments application stored on the device associated with the user, a first request to associate a payment instrument of the user with a profile of the user;
    associating the payment instrument with the profile of the user;
    receiving, at the payment service, and from a first merchant device associated with a first merchant, a second request to authorize the payment instrument for a cost of a first item, the second request including at least payment information received by a first card reader from the payment instrument;
    attempting to authorize the payment instrument for the cost of the first item;
    identifying, from the second request, a first item preference, the first item preference representing a customization to the first item, the customization requested at a time the first item was ordered from the first merchant;
    identifying, based at least in part on the payment information, the profile of the user;
    associating, at the payment service, and based at least in part on identifying the profile of the user, the first item preference with the profile of the user;
    receiving, at the payment service, from a second merchant device associated with a second merchant, a third request to authorize the payment instrument for a cost of a second item, the third request including at least the payment information received by a second card reader from the payment instrument;
    identifying, based at least in part on the payment information, the profile of the user; and
    associating, at the payment service, and based at least in part on identifying the profile of the user, a second item preference representing a second customization of the second item with the profile of the user.

6. The method as recited in claim 5, further comprising:
attempting to authorize the payment instrument of the user for a cost of the second item; and
identifying, from the third request the second item preference of the user.

7. The method as recited in claim 5, wherein the first item preference comprises a size of the first item, an ingredient to include or not include in the first item, a preparation type of the first item, a color of the first item, or a flavor of the first item.

8. The method as recited in claim 5 further comprising:
receiving an indication that the user is located at the second merchant; and
sending, to the second merchant device, a message indicating the first item preference of the user.

9. The method as recited in claim 8, wherein receiving the indication comprises receiving an indication that the device associated with the user is proximate to the second merchant device.

10. The method as recited in claim 8, wherein receiving the indication comprises receiving an indication that the user has checked in at the second merchant.

11. The method as recited in claim 5, further comprising:
receiving an indication that the user is located at the second merchant;
determining that the second merchant offers an item for which the first item preference of the user is applicable; and
sending, to the second merchant device, a message indicating the first item preference of the user.

12. One or more computing devices comprising:
one or more processors; and
one or more computer-readable media that, when executed, cause the one or more processors to perform acts comprising:
causing an instance of a payments application to be sent to a device associated with a user, the payments application enabling the user to engage in transactions with merchants that utilize the one or more computing devices to authorize payment instruments;
receiving, via the instance of the payments application stored on the device associated with the user, a first request to associate a payment instrument of the user with a profile of the user;
associating the payment instrument with the profile of the user;
receiving, from a first merchant device associated with a first merchant, a second request to authorize the payment instrument for a cost of a first item, the second request including at least payment information received by a first card reader from the payment instrument;
identifying a first item preference of the user, the user having expressed the first item preference at a time of ordering the first item from the first merchant;
identifying, based at least in part on the payment information, the profile of the user;
associating, based at least in part on identifying the profile of the user, the first item preference with the profile of the user;
receiving, from a second merchant device associated with a second merchant, a third request to authorize the payment instrument for a cost of a second item, the third request including at least the payment information received by a second card reader;
identifying a second item preference of the user, the user having expressed the second item preference at a time of ordering the second item from the second merchant;
identifying, based at least in part on the payment information, the profile of the user; and
associating, based at least in part on identifying the profile of the user, the second item preference with the profile of the user.

13. The one or more computing devices as recited in claim 12, the acts further comprising:
attempting to authorize the payment instrument of the user for the cost of the first item;
and wherein the first item preference is identified based at least in part on the second request.

14. The one or more computing devices as recited in claim 12, wherein the first item preference comprises a size of the first item, an ingredient to include or not include in the first item, a preparation type of the first item, a color of the first item, or a flavor of the first item.

15. The one or more computing devices as recited in claim 12, the acts further comprising sending at least one of the first item preference or the second item preference to a third merchant device associated with a third merchant.

16. A method comprising:
causing an instance of a payments application to be sent to a device associated with a user, the payments application enabling the user to engage in transactions with merchants that utilize a payment service to authorize payment instruments;
receiving, via the instance of the payments application stored on the device associated with the user, a first request to associate a payment instrument of the user with a profile of the user;
associating the payment instrument with the profile of the user;
receiving, at the payment service, a second request to authorize the payment instrument for a cost of a transaction at a merchant, the second request indicating at least:
payment information received by a card reader from the payment instrument;
a particular item ordered by the user as part of the transaction; and
a preference of the user pertaining to the particular item;
attempting to authorize the payment instrument for the cost of the transaction;
identifying, using the payment information, the profile of the user at the payment service;
identifying, from the second request, the preference of the user pertaining to the particular item; and
storing, based at least in part on identifying the profile, and in the profile of the user at the payment service, an indication of the preference of the user pertaining to the particular item.

17. The method as recited in claim 16, wherein the transaction comprises a first transaction, the merchant comprises a first merchant, the particular item comprises a first particular item, and the preference comprises a first preference, and further comprising:
receiving, at the payment service, a third request to authorize the payment instrument for a cost of a second transaction at a second merchant, the third request indicating at least:

the payment information;
a second particular item ordered by the user as part of the second transaction; and
a second preference of the user pertaining to the second particular item;

attempting to authorize the payment instrument for the cost of the second transaction;

identifying, using the payment information, the profile of the user at the payment service;

identifying, from the third request, the second preference of the user pertaining to the second particular item; and storing, in the profile of the user at the payment service, an indication of the second preference of the user pertaining to the second particular item.

18. The method as recited in claim 1, further comprising:

receiving, via the payments application stored on the device associated with the user, a fourth request to purchase a third item from a third merchant;

identifying, based at least in part on receiving the fourth request, the profile of the user; and sending, to the device associated with the user, a message indicating at least one of the first item preference or the second item preference.

19. The method as recited in claim 16, wherein the particular item includes a first item, and the merchant includes a first merchant, and wherein the method further comprising:

receiving, via the payments application stored on the device associated with the user, a third request to purchase a second item from a second merchant;

identifying, based at least in part on receiving the third request, the profile of the user; and sending, to the device associated with the user, a message indicating the preference.

20. The method as recited in claim 16, further comprising:

receiving, via the payments application stored on the device associated with the user, a third request to purchase the particular item from the merchant;

identifying, based at least in part on receiving the third request, the profile of the user; and sending, to the device associated with the user, a message indicating the preference.

\* \* \* \* \*